B. V. GARWOOD.
ONION SEED PLANTER.
APPLICATION FILED MAY 1, 1909.
936,883.
Patented Oct. 12, 1909.
2 SHEETS—SHEET 1.
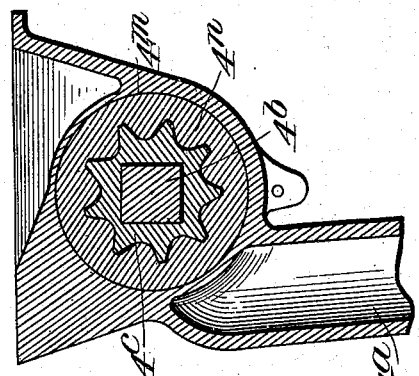
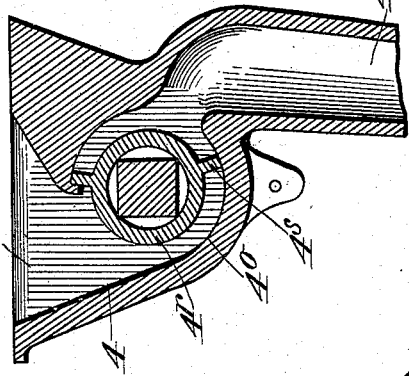
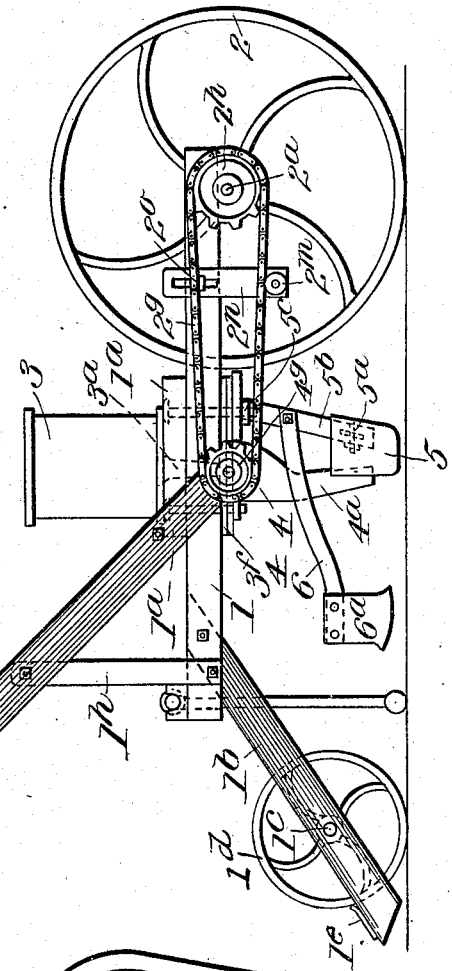
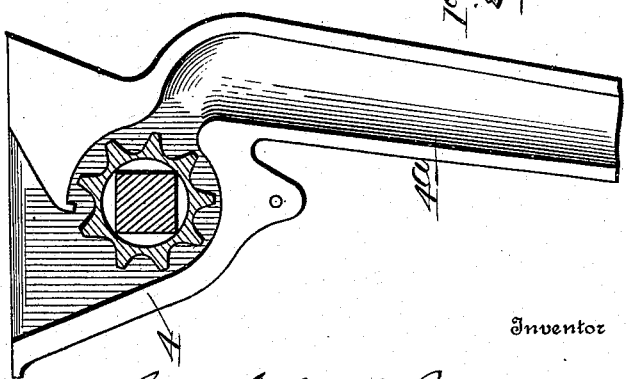

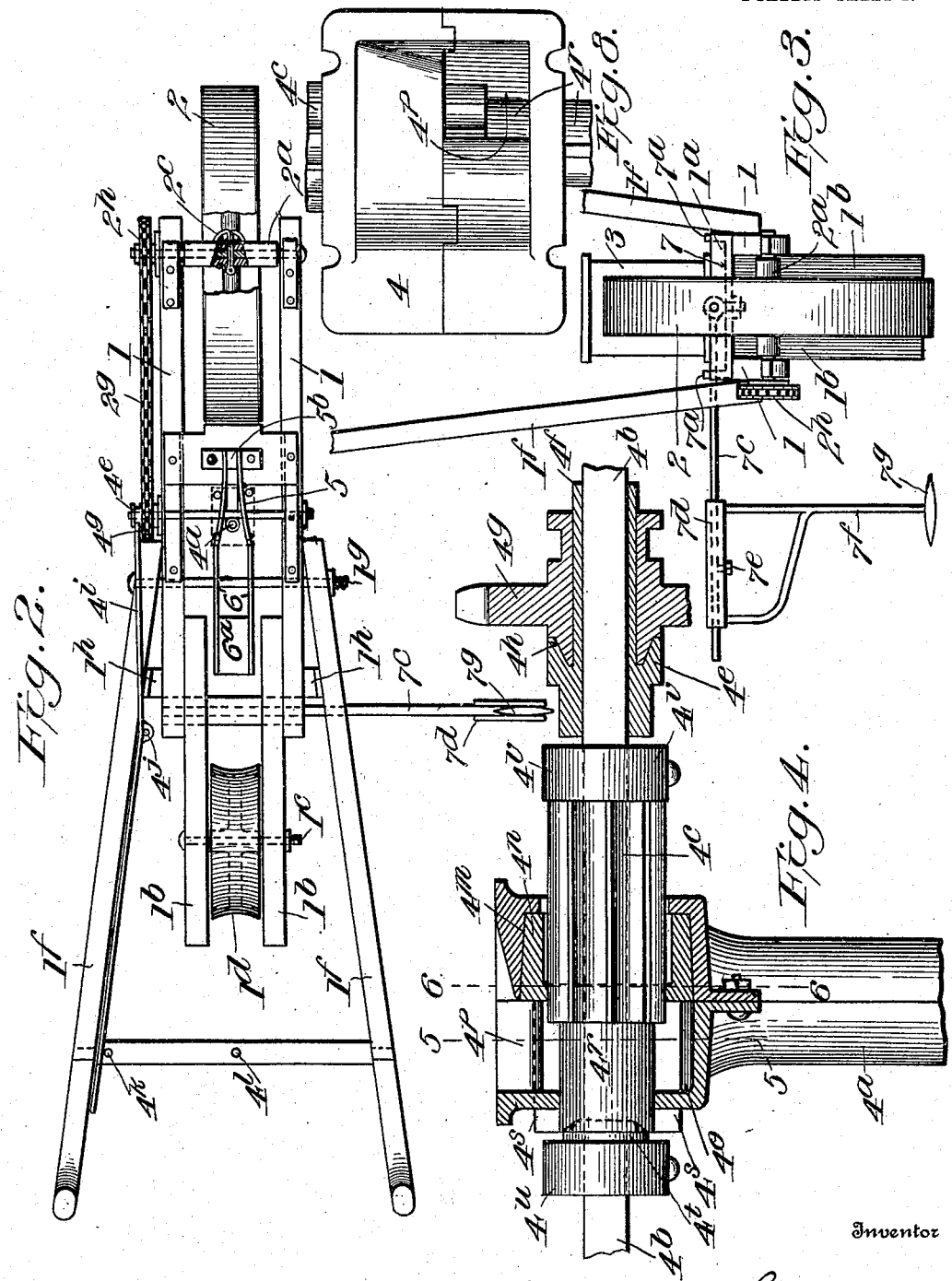

UNITED STATES PATENT OFFICE.

BETHEL VEECH GARWOOD, OF WORTHINGTON, KENTUCKY.

ONION-SEED PLANTER.

936,883.  Specification of Letters Patent.  Patented Oct. 12, 1909.

Application filed May 1, 1909. Serial No. 493,343.

*To all whom it may concern:*

Be it known that I, BETHEL VEECH GARWOOD, of Worthington, in the county of Jefferson and State of Kentucky, have invented certain new and useful Improvements in Onion-Seed Planters; and I hereby declare that the following is a full, clear, and exact description thereof, reference being had to the accompanying drawings, which form part of this specification.

This invention is an improvement in machines for sowing onion seed and other small seeds. Its objects are (1) to produce a machine by which such seed can be sown in very narrow spaces and properly covered; (2) to make such a machine of simple construction, and to provide it with novel means for opening the furrows, dropping the seed, covering the furrows, and making a line for the succeeding row.

The invention will be clearly understood from the following description of the machine illustrated in the accompanying drawings; in which—

Figure 1 is a side elevation of the complete machine. Fig. 2 is a bottom plan view thereof. Fig. 3 is a detail end view. Fig. 4 is an enlarged sectional view through the seeding device. Fig. 5 is a vertical section on line 5—5, Fig. 4. Fig. 6 is a vertical section on line 6—6, Fig. 4. Fig. 7 is a detail view of one of the combined hopper and seed spout castings, and showing the shaft and feed cylinder in section. Fig. 8 is a detail plan view of the feeding devices.

The frame of the machine comprises two parallel side bars 1 connected by cross pieces $1^a$ near the center supported upon a front wheel 2 journaled on a shaft or axle $2^a$ which is journaled in hangers on the under side of the beams 1 at the forward ends thereof. The wheel 2 may be fastened to the shaft by means of a cotter $2^c$ so as to cause the shaft to rotate with the wheel, for a purpose hereinafter explained.

The rear end of the frame is provided with downwardly and rearwardly inclined bars $1^b$ which are bolted to the rear end of the bars 1 and are supported at their lower ends on a wheel $1^d$ rotatably mounted on a bolt or shaft $1^c$ transfixing the bars $1^b$ and a scraper $1^e$ is attached to the bars $1^b$ to clean the wheel $1^d$. Handles $1^f$ are attached to the bars 1 by a through-bolt $1^g$ and are supported thereon by braces $1^h$ bolted to the rear end of the bars 1 and to the handles as shown.

On the cross pieces $1^a$ is mounted a hopper 3 which is provided with a discharge spout $3^a$ that depends below the frame, and communicates with a small feed cup or hopper 4 which is bolted to a plate $3^f$ on the under side of the frame and which is provided with a delivery spout $4^a$ that depends down to the furrow opener 5, hereinafter referred to.

The hopper 4 and spout $4^a$ are preferably formed of two longitudinal complemental castings, which are fastened together by bolts as indicated in Fig. 4; or in any other suitable manner. One of these castings has a cylindrical recess $4^m$ in the hopper portion, in which recess is a cylinder or rosette $4^n$ which is provided with internal grooves corresponding to the exterior fluting of a feed cylinder $4^c$, which is placed on shaft $4^b$, the shaft being preferably squared so as to cause the cylinder $4^c$ to rotate therewith. In the hopper portion of the other casting is a cylindrical recess $4^o$ provided with an inlet opening $4^p$ in its top; and in the outside wall of this casting is a cylindrical opening in which is slidably fitted a feed regulating cylinder $4^r$ which is of sufficiently large internal diameter to permit the shaft $4^b$ to rotate freely therein, the cylinder $4^r$ being locked from rotation by means of ribs $4^s$ engaging corresponding slots in the end wall of said hopper casting. A washer $4^t$ may be strung on the shaft $4^b$ adjacent the outer end of cylinder $4^r$ to keep the latter properly centered on the shaft without rotating therewith. The feed cylinder $4^c$ and feed regulating cylinder $4^r$ are kept in position on the shaft 4 by means of collars $4^u$, $4^v$, which are adjustably secured to the shaft by means of set-screws as shown. The cylinders $4^r$, $4^c$, can be adjusted longitudinally of the shaft $4^b$ and transversely of the hopper 4 by shifting the collars $4^u$, $4^v$, and thus more or less of the feed-cylinder $4^c$ can be brought under or into register with the feed opening $4^p$, and the quantity of seed which will be fed by the machine is regulated by adjusting the length or extent of the feed-cylinder projecting under this feed opening; and the space under the feed opening not covered by cylinder $4^c$ is closed by the non-rotatable cylinder $4^r$, past which no seed can escape,—only the seed which enters the grooves or cups in the periphery of cylinder 4c being delivered to the spout 4a.

The shaft 4b has on its other end a clutch member 4e which has a cylindrical extension 4f on which is rotatably mounted a sprocket 4g which has a clutch-face 4h which may be engaged with the clutch-member 4e or disengaged therefrom by sliding the sprocket 4g on the sleeve 4f. The sprocket 4g can be held in or out of engagement with the clutch 4e by means of a lever 4i which is pivoted on the frame at 4j and extends up beside one of the handles 1f within convenient reach of the operator. This lever can be engaged with a pin 4k on the cross piece of the handles to hold the clutch in engagement, or with a pin 4l on the cross piece to hold the clutch out of engagement.

The sprocket 4g may be driven from the shaft 2a by means of a sprocket-chain 2g and the sprocket 2h fast on shaft 2a. This chain 2g may be properly tensioned by means of a roller 2m engaging the under side of the chain and attached to a plate 2n adjustably secured to the side bar 1 by means of a slot and bolt as shown at 2o.

The discharge spout 4a is very narrow in width and depends behind a furrow opener 5 which consists of a metal plate bent into a U-shape and secured by a bolt 5a to the lower end of a standard 5b bolted to the under side of the frame in advance of the seed hopper as indicated at 5c. To the standard 5b above the furrow opener are attached bars 6 which extend to the rear of the side spout and are connected at their rear ends to an inverted U-shape plate 6a whose top portion forms a connection between the rear ends of the bars and whose depending side portions 6a form the furrow closers that cover the seed.

The rear end of the bars 1 are connected by a cross bar 7 whose ends are upturned and notched as shown at 7a. Pivotally connected to the center of this bar is a rod 7c which may be turned either to the right or left of the frame and engage with one of the notches 7a. On the rod 7c is a slide 7d which can be fastened in any adjusted position by means of a set-screw 7e and from this slide depends a rod 7f carrying a sharpened marker 7g by which the position for the succeeding row is marked simultaneously with the planting of a row.

This machine can be easily operated by hand. To make a power machine, the seed feeding devices and furrow openers and closers, can be duplicated on the shaft 4b; but for a small hand machine only one set may be used, as indicated in the drawings. By adjusting the feed and regulating cylinders 4c, 4r, laterally in the feed hoppers the amount of seed delivered can be regulated with great nicety anywhere between the minimum and maximum capacity of opening 4p. The machine will sow fine seed regularly and evenly and at the end of a row the feed can be readily stopped without wasting seed; and whether the machine be moved rapidly or slowly it will feed the same amount of seed in the row.

Having described my invention what I claim as new and desire to secure by Letters Patent thereon is:

1. In a seed planter, the combination of a frame, a master wheel journaled thereon, a seed hopper, a feed hopper below the seed hopper, a seed delivery spout, a furrow opener in front of said seed spout, and an inverted U-shaped furrow closer behind said spout connected to the furrow opener; a shaft extending transversely through the feed hopper, feed devices on said shaft within the hopper, and means for driving the feed shaft from the master wheel shaft.

2. In a seed planter, the combination of a frame, a master wheel journaled thereon, a seed hopper, a feed hopper below the seed hopper, a seed delivery spout, a furrow opener in front of said seed spout, and a furrow closer behind said spout, a shaft extending transversely through the feed hopper, feed devices longitudinally adjustable on the shaft in the hopper, a sprocket on said shaft, a clutch for locking the sprocket to the feed shaft, a hand lever for shifting said clutch, a sprocket on the master shaft, and a chain for driving the shaft sprocket from the master wheel sprocket.

3. In a seed planter, the combination of a frame, a seed hopper thereon, a feed hopper under the seed hopper and communicating therewith, a shaft passing axially through the seed hopper, a fluted feed cylinder rotatable with the shaft, a non-rotatable feed regulating cylinder beside the feed cylinder, and adjustable collars for positioning the cylinders endwise on the shaft and within the hopper to regulate the amount of seed fed; with a sprocket on said shaft, a master wheel, a sprocket on the master wheel shaft, a chain for driving the hopper shaft sprocket from the wheel shaft sprocket, a clutch for locking the hopper shaft sprocket to its shaft, and connections for throwing said clutch into or out of gear.

4. A feeding device for seeding machines, comprising a hopper and feed spout formed of complemental sections, each of said sections having a cylindrical recess in its upper end forming the hopper, a shaft transfixing said hopper, a fluted feed cylinder on said shaft, and rotatable therewith, a second cylinder in one recess of the hopper fitted loosely over the feed cylinder, a non-rotatable feed regulating cylinder loosely surrounding said shaft and projecting into the other recess and abutting against the feed cylinder, and provided with ribs engaging notches in the end of the hopper, and adjustable collars on the shaft exterior to the hopper and at the outer ends of said feed and regulating cylinders whereby both the latter may be adjusted on the shaft transversely of the hopper and secured in position, substantially as described.

In testimony that I claim the foregoing as my own, I affix my signature in presence of two witnesses.

BETHEL VEECH GARWOOD.

Witnesses:
E. S. MONOHAN, Jr.,
ED. DONNELLY.